US009715762B2

United States Patent
Ward et al.

(10) Patent No.: US 9,715,762 B2
(45) Date of Patent: *Jul. 25, 2017

(54) 3D STADIA ALGORITHM FOR DISCRETE NETWORK MESHING

(71) Applicant: Landmark Graphics Corporation, Houston, TX (US)

(72) Inventors: Steven Bryan Ward, Austin, TX (US); Michael Loyd Brewer, Katy, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/889,110

(22) PCT Filed: Jul. 2, 2013

(86) PCT No.: PCT/US2013/049145
§ 371 (c)(1),
(2) Date: Nov. 4, 2015

(87) PCT Pub. No.: WO2015/002642
PCT Pub. Date: Jan. 8, 2015

(65) Prior Publication Data
US 2016/0104320 A1    Apr. 14, 2016

(51) Int. Cl.
*G06T 17/20* (2006.01)
*G06T 17/05* (2011.01)
(Continued)

(52) U.S. Cl.
CPC ............... *G06T 17/20* (2013.01); *G06K 9/52* (2013.01); *G06T 7/60* (2013.01); *G06T 17/05* (2013.01);
(Continued)

(58) Field of Classification Search
CPC ......... G06T 15/10; G06T 17/05; G06T 17/20; G06T 7/0083; G01V 99/005;
(Continued)

(56) References Cited

U.S. PATENT DOCUMENTS

2007/0027666 A1    2/2007 Frankel
2008/0091396 A1*   4/2008 Kennon ................. G01V 1/301
                                                  703/10

(Continued)

FOREIGN PATENT DOCUMENTS

| EA | 004217 B1 | 2/2004 |
| RU | 2321064 C2 | 3/2008 |
| RU | 2010140935 A | 4/2012 |

OTHER PUBLICATIONS

International Search Report and Written Opinion, Mar. 20, 2014, 11 pages; Korean International Searching Authority.
(Continued)

*Primary Examiner* — Jeffrey Chow (57) ABSTRACT

The disclosed embodiments include a method, apparatus, and computer program product for modeling three dimensional objects, such as, but not limited to, fractures, for the purpose of reservoir simulation. For example, one disclosed embodiment includes a method that receives a set of 3D fractures with geometry that has been discretized by 2D surfaces by a collection of polygonal facets, generates a set of 3D stadia at specified radii around each facet in the collection of polygonal facet, generates closed 3D stadia surfaces around intersecting facets, discretizes all 3D stadia surfaces using various shape cells, generates 3D cells within each of the closed 3D stadia surfaces, and assigns each cell reservoir properties suitable for a numeric simulation program, such as, but not limited to, Nexus® Reservoir Simulation Software.

18 Claims, 7 Drawing Sheets (51) Int. Cl.
*G06K 9/52* (2006.01)
*G06T 7/60* (2017.01)
(52) U.S. Cl.
CPC *G06T 2200/04* (2013.01); *G06T 2207/30181* (2013.01)
(58) Field of Classification Search
CPC ......... G01V 2210/64; G01V 2210/646; G01V 2210/66; G06F 3/04815; G06F 17/30241; G06F 17/50; G06F 15/17381
See application file for complete search history.

(56) References Cited

U.S. PATENT DOCUMENTS

2010/0076738 A1 3/2010 Dean et al.
2012/0267104 A1 10/2012 Clarkson et al.
2013/0124169 A1 5/2013 Sung

OTHER PUBLICATIONS

Federal Service on Industrial Property, Official Action, Jun. 23, 2016, 6 pages, Russia.
Federal Service on Industrial Property, Official Action, Jun. 23, 2016, 3 pages, English Translation, Russia.

* cited by examiner

3D STADIA ALGORITHM FOR DISCRETE NETWORK MESHING

CROSS-REFERENCE TO RELATED APPLICATIONS

This application is a U.S. national stage patent application of International Patent Application No. PCT/US2013/049145, filed on Jul. 2, 2013, the benefit of which is claimed and the disclosure of which is incorporated herein by reference in its entirety.

BACKGROUND OF THE INVENTION

1. Field of the Invention

The present invention generally relates to a system and method for generating a grid that can be used to construct a simulation model of a subsurface reservoir, and more particularly, to a system and method configured for modeling geological fractures.

2. Discussion of the Related Art

In the oil and gas industry, reservoir modeling involves the construction of a computer model of a petroleum reservoir for the purpose of improving estimation of reserves and making decisions regarding the development of the field. For example, geological models may be created to provide a static description of the reservoir prior to production. In contrast, reservoir simulation models may be created to simulate the flow of fluids within the reservoir over its production lifetime.

One challenge with reservoir simulation models is the modeling of fractures within a reservoir, which requires a thorough understanding of matrix flow characteristics, fracture network connectivity and fracture-matrix interaction. Fractures can be described as open cracks or voids within the formation and can either be naturally occurring or artificially generated from a wellbore. The correct modeling of the fractures is important as the properties of fractures such as spatial distribution, aperture, length, height, conductivity, and connectivity significantly affect the flow of reservoir fluids to the well bore.

Accordingly, the disclosed embodiments provide a system, method, and computer program product for generating 3D hybrid computational meshes around complex and discrete fractures for the purpose of reservoir simulation.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include a system and method for modeling three-dimensional (3D) objects, such as, but not limited to, geological fractures. The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
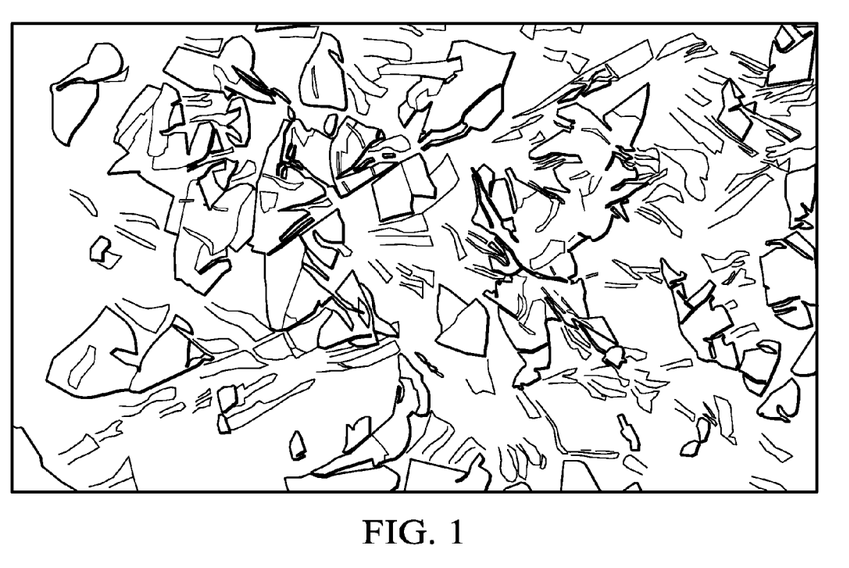
FIG. 1 illustrates an image of three-dimensional fractures that are modeled in accordance with the disclosed embodiments.

FIG. 1 illustrates an image of three-dimensional fractures that are modeled in accordance with the disclosed embodiments. As can be seen in image 100, the layers of earth formation include fractures within the formation. As stated above, these fractures can be described as open cracks or voids within the formation and can either be naturally occurring or artificially generated from a wellbore. Understanding and modeling the proper characteristic of these fractures is important as the fractures enable and affect the flow of reservoir fluids to the well bore. Images such as image 100 may be obtained or generated using image logs. Image logs use a rotating transducer to measure acoustic impedance across the entire borehole wall to identify the presence and direction of rock fractures, as well as understanding the dip direction of the stratigraphy.

Figure 2:
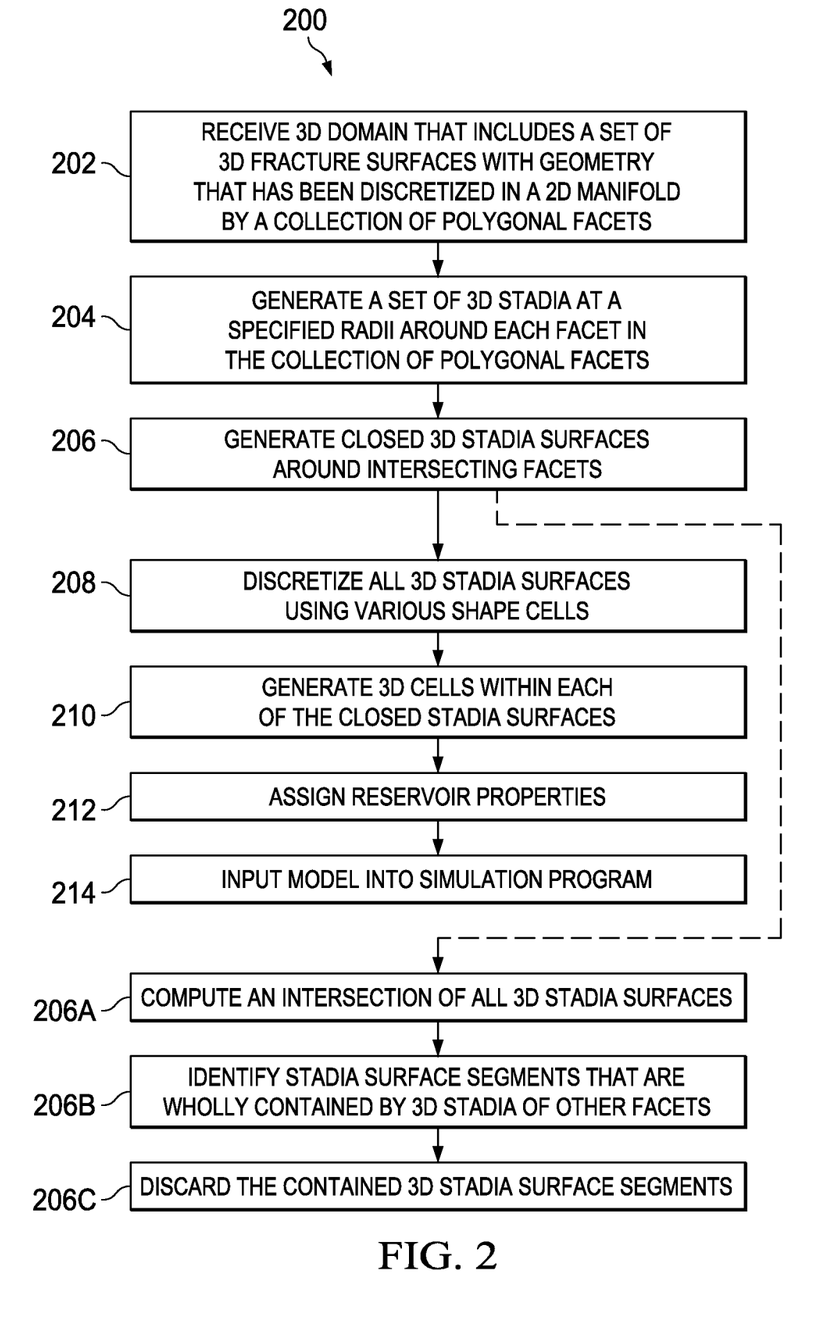
FIG. 2 is a flow diagram illustrating a method for modeling three-dimensional fractures in accordance with a disclosed embodiment.

FIG. 2 is a flow diagram illustrating a method/process 200 for modeling three-dimensional fractures in accordance with a disclosed embodiment. In the depicted embodiment, the method begins by receiving a 3D domain that includes a set of 3D fracture surfaces with geometry that has been discretized in a 2D manifold by a collection of polygonal facets (step 202). In an alternative embodiment, the process 200 may begin by discretizing the set of 3D fracture surfaces into a 2D manifold having a collection of polygonal facets to generate the 3D domain.

At step 204, the method generates a set of 3D stadia at specified radii around each facet in the collection of polygonal facets. In one embodiment, each 3D stadium consists of two planar faces parallel to the facet, semi-cylinders along each edge, and spherical sections at each vertex to completely enclose the original facet where the distance from each surface to the facet is a constant radius. In certain embodiments, the number of 3D stadia and/or the specified radii around each facet in the collection of polygonal facets may be a user modifiable parameter.

At step 206, the method generates closed 3D stadia surfaces around intersecting facets. In one embodiment, step 206 includes computing an intersection of all 3D stadia surfaces for each specified radius (step 206A), identifying 3D stadia surface segments that are wholly contained by 3D stadia of other facets (step 206B), and discarding the contained surface segments to result in closed surfaces around the facets (step 206C).

The process then discretizes all 3D stadia surfaces using various shape cells such as, but not limited to, triangles, quadrilaterals, and general polygons (step 208). The resulting sets of manifolds of 2D elements are then filled with 3D cells (step 210). From here, the process can assign reservoir properties such as, but not limited to, porosity and permeability, to each of the cells for modeling the fluid flow of the reservoir (step 212). These property values may be manually entered by a user or may be automatically extracted from well logs or from databases containing the pertinent geological information.

Finally, in one embodiment, the process inputs the three-dimensional cellular model into a simulation program, such as, but not limited to, Nexus® reservoir simulation software, for performing numerical simulation and for assessing the fluid flow (step 214), with process 200 terminating thereafter.

Figure 3:
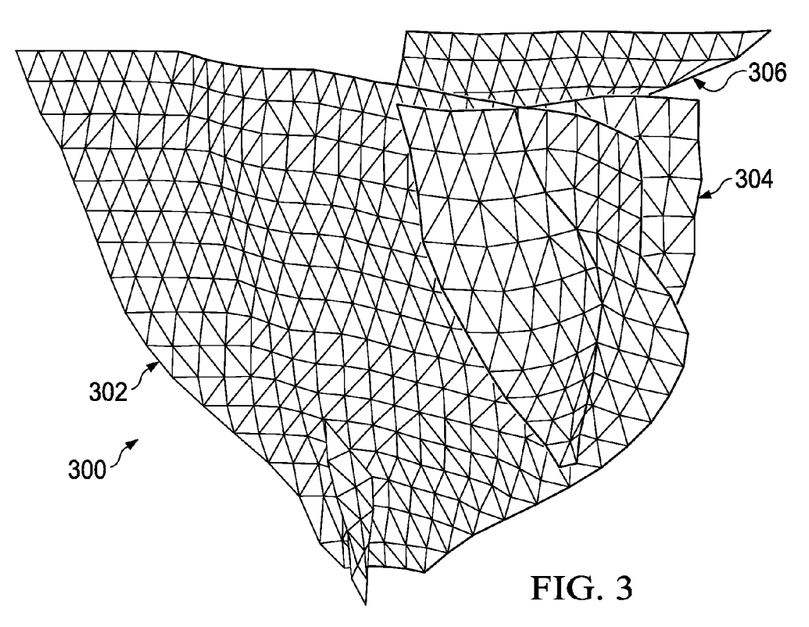
FIG. 3 illustrates an example of a set of 3D fractures with geometry that has been discretized by 2D surfaces by a collection of polygonal facets in accordance with the disclosed embodiments.

FIG. 3 illustrates an example a set of 3D fractures 300 with geometry that has been discretized by 2D surfaces by a collection of polygonal facets in accordance with the disclosed embodiments. In the depicted embodiment, the set of 3D fractures 300 includes three intersecting fractures 302, 304, and 306. In particular, fracture 302 is intersected by fracture 304 and also by fracture 306. Each of the fractures 302, 304, and 306 has been discretized by 2D surfaces by a collection of polygonal facets. Although triangular facets are illustrated, the disclosed embodiments may use any polygonal-shaped facet.

Figure 4:
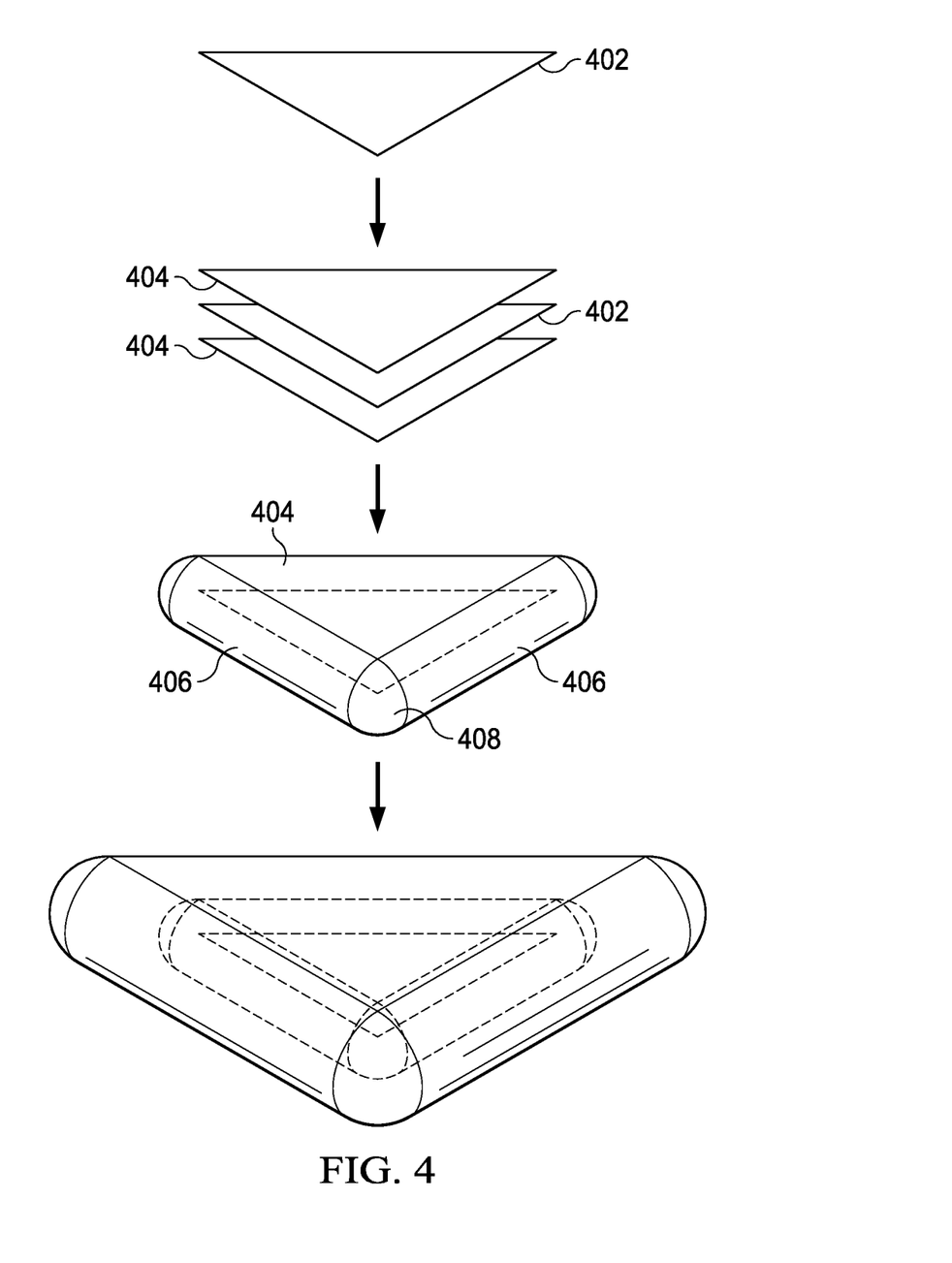
FIG. 4 provides an illustration of a process for generating a set of 3D stadia at specified radii around a polygonal facet in accordance with the disclosed embodiments.

FIG. 4 provides an illustration of a process for generating a set of 3D stadia at specified radii around a polygonal facet 402 in accordance with the disclosed embodiments. In the depicted embodiment, two planar faces 404 parallel to the facet 402 at a specified radius is generated. Next, semi-cylinders 406 along each edge and spherical sections 408 are generated at each vertex to completely enclose the original facet 402. The distance from each surface to the facet 402 is a constant radius.

A second 3D stadium is then constructed in a similar manner around the first 3D stadium at a constant radius from the first 3D stadium to completely enclose the first 3D stadium and the facet 402. In certain embodiments, the radius between the second 3D stadium and the first 3D stadium is the same as the radius between the first 3D stadium and the facet 402. Alternatively, in some embodiments, the radius between the second 3D stadium and the first 3D stadium may differ from the radius between the first 3D stadium and the facet 402. Additional 3D stadia are then generated in the same manner to enclose the second 3D stadium and so on. As previously stated, in certain embodiments, the number of 3D stadia and/or the specified radii around each facet in the collection of polygonal facets may be a user modifiable parameter.

Figure 5:
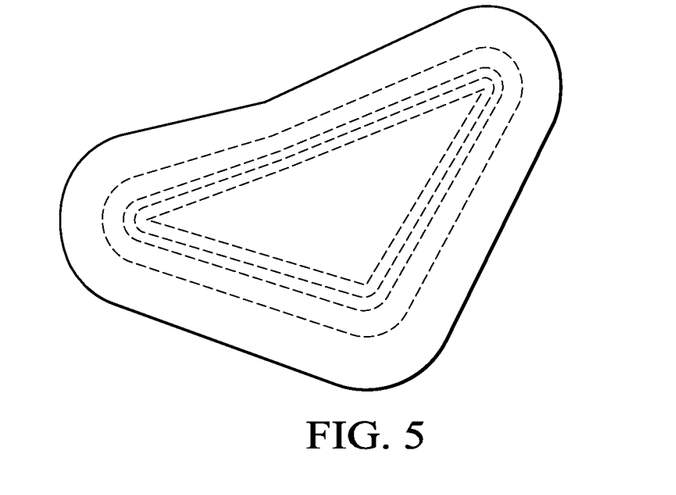
FIG. 5 illustrates an example of an internal view of a set of 3D stadia generated around a polygonal facet in accordance with the disclosed embodiments.
Figure 5A:
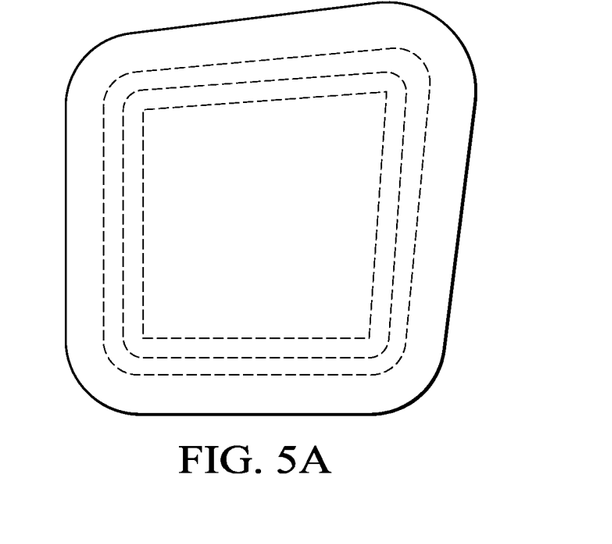
FIG. 5A illustrates another example of an internal view of a set of 3D stadia generated around another polygonal facet in accordance with the disclosed embodiments.

FIG. 5 illustrates an example of an internal top view of a set of 3D stadia generated around a triangular shaped polygonal facet in accordance with the disclosed embodiments. FIG. 5A illustrates another example of an internal top view of a set of 3D stadia generated around a trapezoidal shaped polygonal facet in accordance with the disclosed embodiments. As can be seen from the illustrated embodiments, each of polygonal shaped facets is surrounded by a set of similarly shaped 3D stadia.

Figure 6:
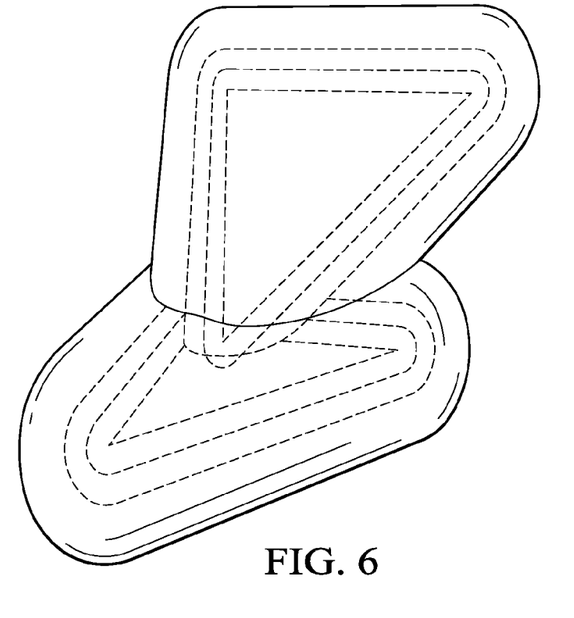
FIG. 6 illustrates an example of an internal view of a set of intersecting 3D stadia generated around two adjacent polygonal facets in accordance with the disclosed embodiments.
Figure 6A:
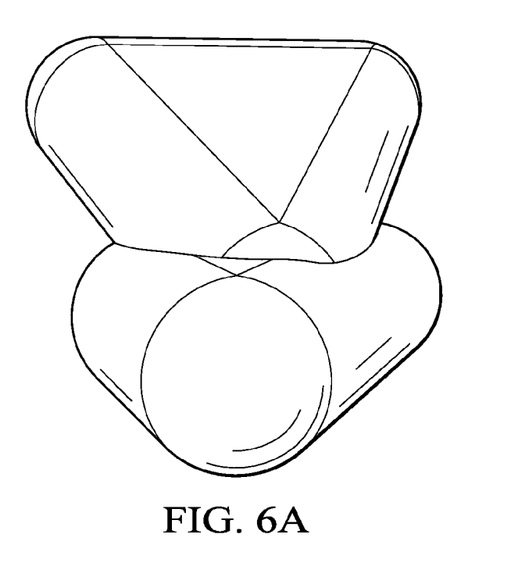
FIG. 6A illustrates an example of a 3D exterior view of the set of intersecting 3D stadia of FIG. 6 in accordance with the disclosed embodiments.

As the process generates the sets of 3D stadia around the polygonal facets, the sets of 3D stadia for neighboring/adjacent polygonal facets will intersect each other. For example, FIG. 6 illustrates an example of an internal view of two sets of 3D stadia generated around two adjacent polygonal facets that intersect one another in accordance with the disclosed embodiments. As described in process 200, in one embodiment, the disclosed method generates closed 3D stadia surfaces around these intersecting facets by computing an intersection of all 3D stadia surfaces for each specified radius to identify 3D stadia surface segments that are wholly contained by 3D stadia of other facets and discarding the contained surface segments to result in closed surfaces around the facets. For instance, FIG. 6A illustrates an example of a generated 3D exterior view of the sets of intersecting 3D stadia of FIG. 6 in which the intersecting wholly contained surface segments have been discarded.

Figure 7:
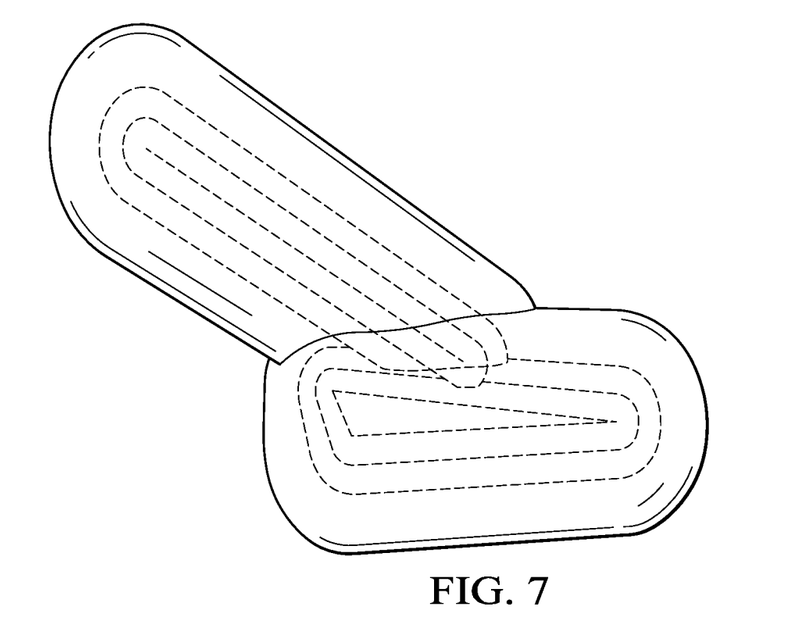
FIG. 7 illustrates another example of an internal view of a set of intersecting 3D stadia generated around two adjacent polygonal facets in accordance with the disclosed embodiments.
Figure 7A:
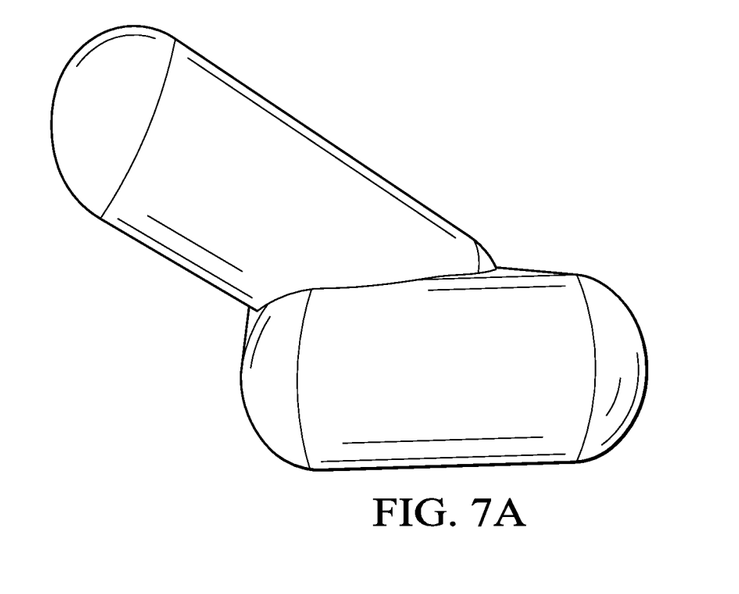
FIG. 7A illustrates an example of a 3D exterior view of the set of intersecting 3D stadia of FIG. 7 in accordance with the disclosed embodiments.

FIG. 7 illustrates another example of an internal view of two sets of 3D stadia generated around two adjacent polygonal facets that intersect one another in accordance with the disclosed embodiments. FIG. 7A illustrates an example of a 3D exterior view of the closed surfaces around the facets of the two sets of intersecting 3D stadia of FIG. 7 in accordance with the disclosed embodiments.

Figure 8:
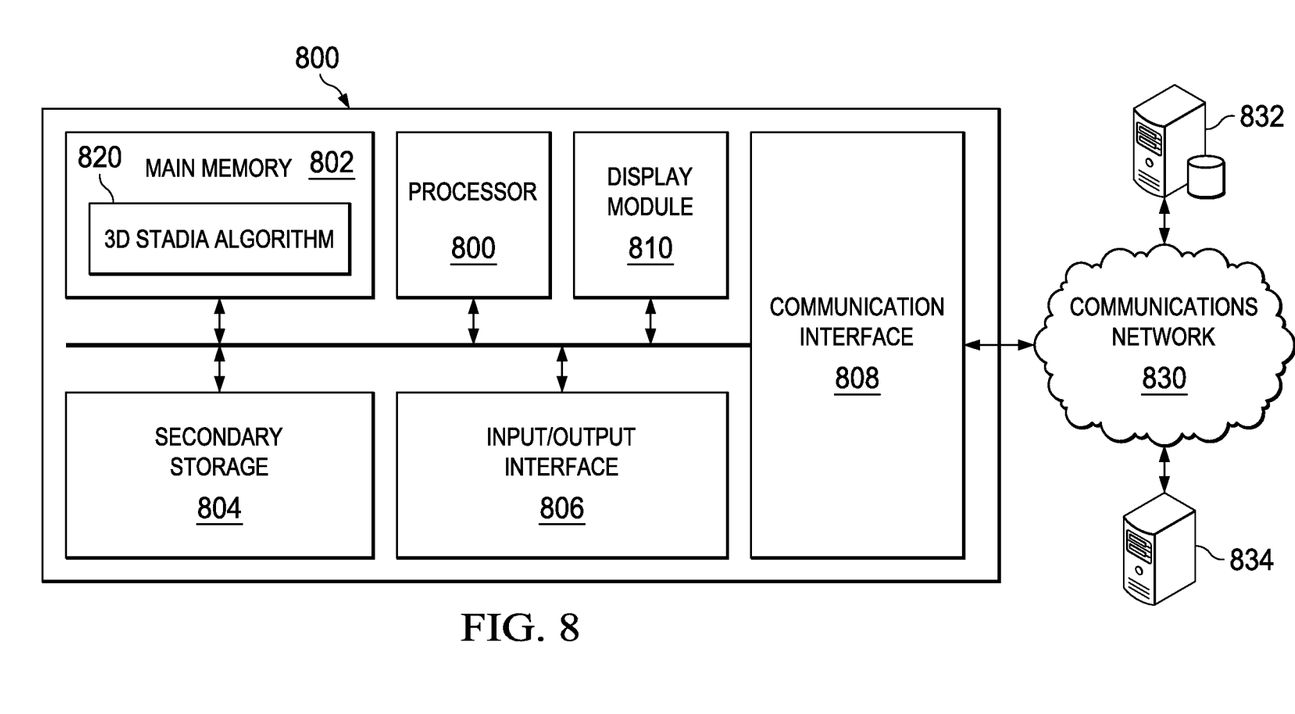
FIG. 8 is a block diagram illustrating one embodiment of a system for implementing the disclosed embodiments.

FIG. 8 is a block diagram illustrating one embodiment of a system 800 for implementing the features and functions of the disclosed embodiments. The system 800 includes, among other components, a processor 800, main memory 802, secondary storage unit 804, an input/output interface module 806, and a communication interface module 808. The processor 800 may be any type or any number of single core or multi-core processors capable of executing instructions for performing the features and functions of the disclosed embodiments.

The input/output interface module 806 enables the system 800 to receive user input (e.g., from a keyboard and mouse) and output information to one or more devices such as, but not limited to, printers, external data storage devices, and audio speakers. The system 800 may optionally include a separate display module 810 to enable information to be displayed on an integrated or external display device. For instance, the display module 810 may include instructions or hardware (e.g., a graphics card or chip) for providing enhanced graphics, touchscreen, and/or multi-touch functionalities associated with one or more display devices.

Main memory 802 is volatile memory that stores currently executing instructions/data or instructions/data that are prefetched for execution. The secondary storage unit 804 is non-volatile memory for storing persistent data. The secondary storage unit 804 may be or include any type of data storage component such as a hard drive, a flash drive, or a memory card. In one embodiment, the secondary storage unit 804 stores the computer executable code/instructions and other relevant data for enabling a user to perform the features and functions of the disclosed embodiments.

For example, in accordance with the disclosed embodiments, the secondary storage unit 804 may permanently store the executable code/instructions of the above-described 3D stadia algorithm 820 for modeling three-dimensional (3D) objects such as, but not limited to, geological fractures. The instructions associated with the 3D stadia algorithm 820 are then loaded from the secondary storage unit 804 to main memory 802 during execution by the processor 800 as illustrated in FIG. 8.

The communication interface module 808 enables the system 800 to communicate with the communications network 830. For example, the network interface module 808 may include a network interface card and/or a wireless transceiver for enabling the system 800 to send and receive data through the communications network 830 and/or directly with other devices.

The communications network 830 may be any type of network including a combination of one or more of the following networks: a wide area network, a local area network, one or more private networks, the Internet, a telephone network such as the public switched telephone network (PSTN), one or more cellular networks, and wireless data networks. The communications network 830 may include a plurality of network nodes (not depicted) such as routers, network access points/gateways, switches, DNS servers, proxy servers, and other network nodes for assisting in routing of data/communications between devices.

For example, in one embodiment, the system 800 may interact with one or more servers 834 or databases 832 for performing the features of the present invention. For instance, the system 800 may query the database 832 for geological information for assigning reservoir properties to cells for performing a simulation. The system 800 may query the database 832 for well log information for determining fracture orientation or density for enabling modeling of the fractures in accordance with the disclosed embodiments. Further, in certain embodiments, the system 800 may act as a server system for one or more client devices or a peer system for peer to peer communications or parallel processing with one or more devices.

Accordingly, as described above, advantages of the disclosed embodiments include, but are not limited to, providing fast generation of unstructured grids with structured elements around complex geometries. In addition, low expertise is required on the part of the user to be able to utilize the disclosed embodiments to generate high quality grid cells that are suitable for many numeric simulators. For instance, the disclosed embodiments enable workflows for non-experts to use advanced numeric modeling techniques for complicated geometries that would have previously required users to make gross approximations and/or require per-use assistance from numeric modeling experts.

While specific details about the above embodiments have been described, the above hardware and software descriptions are intended merely as example embodiments and are not intended to limit the structure or implementation of the disclosed embodiments. For instance, although many other internal components of the system 800 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

In addition, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosed embodiments include a method, apparatus, and computer program product for generating 3D hybrid computational meshes around complex and discrete fractures for the purpose of reservoir simulation. For example, one disclosed embodiment is a computer-implemented method for modeling three-dimensional (3D) geological fractures. The method includes the steps of receiving a set of 3D fractures with geometry that has been discretized by 2D surfaces by a collection of polygonal facets. The method generates a set of 3D stadia at specified radii around each facet in the collection of polygonal facets. The method then generates closed 3D stadia surfaces around intersecting facets. The method discretizes all 3D stadia surfaces using various shape cells and generates 3D cells within each of the closed 3D stadia surfaces. The method may further assign each cell reservoir properties suitable for a numeric simulation program, such as, but not limited to, Nexus® Reservoir Simulation Software.

In some embodiments, generating closed 3D stadia surfaces around intersecting facets comprises computing an intersection of all 3D stadia surfaces, identifying contained 3D stadia surface segments that are wholly contained by 3D stadia of other facets, and discarding the contained 3D stadia surface segments resulting in the closed 3D stadia surfaces around intersecting facets. The various shape cells may include triangles, quadrilaterals, and general polygons. Each 3D stadium may include two planar faces parallel to the facet, semi-cylinders along each edge, and spherical sections at each vertex to completely enclose the facet, and a distance from each surface to the facet may be a constant radius. In another embodiment, the computer-implemented method may further comprise assigning each cell reservoir properties suitable for a numeric simulation program, and the numeric simulation program may be Nexus® Reservoir Simulation Software.

In yet another embodiment, a non-transitory computer readable medium includes computer executable instructions for modeling a three-dimensional ("3D") structure. The computer executable instructions when executed cause one or more machines to perform operations including receiving a set of 3D fractures with geometry that has been discretized by 2D surfaces by a collection of polygonal facets. A set of 3D stadia is generated at specified radii around each facet in the collection of polygonal facets. Closed 3D stadia surfaces are generated around intersecting facets. All 3D stadia surfaces are discretized using various shape cells, and 3D cells are generated within each of the closed 3D stadia surfaces.

In some embodiments, generating closed 3D stadia surfaces around intersecting facets may include computing an intersection of all 3D stadia surfaces, identifying contained 3D stadia surface segments that are wholly contained by 3D stadia of other facets, and discarding the contained 3D stadia surface segments resulting in the closed 3D stadia surfaces around intersecting facets. The various shape cells may include triangles, quadrilaterals, and general polygons. Each 3D stadium may include two planar faces parallel to the facet, semi-cylinders along each edge, and spherical sections at each vertex to completely enclose the facet, and a distance from each surface to the facet may be a constant radius. In another embodiment, the computer readable medium may further comprise computer executable instructions for assigning each cell reservoir properties suitable for a numeric simulation program, and the numeric simulation program may be Nexus® Reservoir Simulation Software.

In still another embodiment, a system includes at least one processor and at least one memory coupled to the at least one processor and storing instructions. When the instructions are executed, the at least one processor performs operations comprising receiving a set of 3D fractures with geometry that has been discretized by 2D surfaces by a collection of polygonal facets, generating a set of 3D stadia at specified radii around each facet in the collection of polygonal facets, generating closed 3D stadia surfaces around intersecting facets, discretizing all 3D stadia surfaces using various shape cells, and generating 3D cells within each of the closed 3D stadia surfaces.

In another embodiment, generating closed 3D stadia surfaces around intersecting facets may include computing an intersection of all 3D stadia surfaces, identifying contained 3D stadia surface segments that are wholly contained by 3D stadia of other facets, and discarding the contained 3D stadia surface segments resulting in the closed 3D stadia surfaces around intersecting facets. The various shape cells may include triangles, quadrilaterals, and general polygons. Each 3D stadium may include two planar faces parallel to the facet, semi-cylinders along each edge, and spherical sections at each vertex to completely enclose the facet, and a distance from each surface to the facet may be a constant radius. In yet another embodiment, the system may further include computer executable instructions for assigning each cell reservoir properties suitable for a numeric simulation program, and the numeric simulation program may be Nexus® Reservoir Simulation Software.

One advantage of the disclosed embodiments is that it enables fast generation of unstructured grids with structured elements around complex geometries.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A computer-implemented method for modeling three-dimensional (3D) geological fractures, the method comprising:
    receiving a set of 3D fractures with geometry that has been discretized by 2D surfaces by a collection of polygonal facets;
    generating a set of 3D stadia at specified radii around each facet in the collection of polygonal facets;
    generating closed 3D stadia surfaces around intersecting facets;
    discretizing all 3D stadia surfaces using various shape cells; and
    generating 3D cells within each of the closed 3D stadia surfaces.

2. The computer-implemented method of claim 1, wherein generating closed 3D stadia surfaces around intersecting facets comprises:
    computing an intersection of all 3D stadia surfaces;
    identifying contained 3D stadia surface segments that are wholly contained by 3D stadia of other facets; and
    discarding the contained 3D stadia surface segments resulting in the closed 3D stadia surfaces around intersecting facets.

3. The computer-implemented method of claim 1, wherein the various shape cells includes triangles, quadrilaterals, and general polygons.

4. The computer-implemented method of claim 1, wherein each 3D stadium consists of two planar faces parallel to the facet, semi-cylinders along each edge, and spherical sections at each vertex to completely enclose the facet, and wherein a distance from each surface to the facet is a constant radius.

5. The computer-implemented method of claim 1, further comprising assigning each cell reservoir properties suitable for a numeric simulation program.

6. The computer-implemented method of claim 5, wherein the numeric simulation program is a reservoir simulation program for modeling fluid flow in a reservoir formation.

7. A non-transitory computer readable medium comprising computer executable instructions for modeling a three-dimensional ("3D") structure, the computer executable instructions when executed causes one or more machines to perform operations comprising:
    receiving a set of 3D fractures with geometry that has been discretized by 2D surfaces by a collection of polygonal facets;
    generating a set of 3D stadia at specified radii around each facet in the collection of polygonal facets;
    generating closed 3D stadia surfaces around intersecting facets;

discretizing all 3D stadia surfaces using various shape cells; and generating 3D cells within each of the closed 3D stadia surfaces.

8. The computer readable medium of claim 7, wherein generating closed 3D stadia surfaces around intersecting facets comprises:
- computing an intersection of all 3D stadia surfaces;
- identifying contained 3D stadia surface segments that are wholly contained by 3D stadia of other facets; and
- discarding the contained 3D stadia surface segments resulting in the closed 3D stadia surfaces around intersecting facets.

9. The computer readable medium of claim 7, wherein the various shape cells includes triangles, quadrilaterals, and general polygons.

10. The computer readable medium of claim 7, wherein each 3D stadium consists of two planar faces parallel to the facet, semi-cylinders along each edge, and spherical sections at each vertex to completely enclose the facet, and wherein a distance from each surface to the facet is a constant radius.

11. The computer readable medium of claim 7, further comprising computer executable instructions for assigning each cell reservoir properties suitable for a numeric simulation program.

12. The computer readable medium of claim 11, wherein the numeric simulation program is a reservoir simulation program for modeling fluid flow in a reservoir formation.

13. A system, comprising:
- at least one processor; and
- at least one memory coupled to the at least one processor and storing instructions that when executed by the at least one processor performs operations comprising:
  - receiving a set of 3D fractures with geometry that has been discretized by 2D surfaces by a collection of polygonal facets;
  - generating a set of 3D stadia at specified radii around each facet in the collection of polygonal facets;
  - generating closed 3D stadia surfaces around intersecting facets;
  - discretizing all 3D stadia surfaces using various shape cells; and
  - generating 3D cells within each of the closed 3D stadia surfaces.

14. The system of claim 13, wherein generating closed 3D stadia surfaces around intersecting facets comprises:
- computing an intersection of all 3D stadia surfaces;
- identifying contained 3D stadia surface segments that are wholly contained by 3D stadia of other facets; and
- discarding the contained 3D stadia surface segments resulting in the closed 3D stadia surfaces around intersecting facets.

15. The system of claim 13, wherein the various shape cells includes triangles, quadrilaterals, and general polygons.

16. The system of claim 13, wherein each 3D stadium consists of two planar faces parallel to the facet, semi-cylinders along each edge, and spherical sections at each vertex to completely enclose the facet, and wherein a distance from each surface to the facet is a constant radius.

17. The system of claim 13, further comprising computer executable instructions for assigning each cell reservoir properties suitable for a numeric simulation program.

18. The system of claim 17, wherein the numeric simulation program is a reservoir simulation program for modeling fluid flow in a reservoir formation.

* * * * *